(12) United States Patent
Li

(10) Patent No.: US 10,295,865 B2
(45) Date of Patent: May 21, 2019

(54) LIQUID CRYSTAL PANEL STRUCTURE AND MANUFACTURE METHOD

(71) Applicant: Shenzhen China Star Optoelectronics Technology Co., Ltd., Shenzhen (CN)

(72) Inventor: Ji Li, Shenzhen (CN)

(73) Assignee: SHENZHEN CHINA STAR OPTOELECTRONICS TECHNOLOGY CO., LTD., Shenzhen, Guangdong (CN)

(*) Notice: Subject to any disclaimer, the term of this patent is extended or adjusted under 35 U.S.C. 154(b) by 162 days.

(21) Appl. No.: 15/115,691

(22) PCT Filed: Jun. 15, 2016

(86) PCT No.: PCT/CN2016/085779
§ 371 (c)(1),
(2) Date: Aug. 1, 2016

(87) PCT Pub. No.: WO2017/193443
PCT Pub. Date: Nov. 16, 2017

(65) Prior Publication Data
US 2018/0088371 A1   Mar. 29, 2018

(30) Foreign Application Priority Data

May 13, 2016   (CN) .......................... 2016 1 0323197

(51) Int. Cl.
*G02F 1/1335* (2006.01)
*G02F 1/1337* (2006.01)
*G02F 1/1343* (2006.01)

(52) U.S. Cl.
CPC .......... *G02F 1/1337* (2013.01); *G02F 1/1343* (2013.01); *G02F 1/133512* (2013.01);
(Continued)

(58) Field of Classification Search
CPC ............. G02F 1/1337; G02F 1/133512; G02F 1/133514; G02F 1/1343
See application file for complete search history.

(56) References Cited

U.S. PATENT DOCUMENTS

| 6,724,449 B1* | 4/2004 | Andry ............... G02F 1/133734 349/124 |
| 7,369,204 B1* | 5/2008 | Choi ................. G02F 1/134363 349/130 |

(Continued)

FOREIGN PATENT DOCUMENTS

CN   1888966 A   1/2007

*Primary Examiner* — Hoan C Nguyen
(74) *Attorney, Agent, or Firm* — Leong C. Lei

(57) ABSTRACT

The present invention provides a liquid crystal panel structure and a manufacture method. Both the first alignment layer of the upper layer and the second alignment layer of the lower substrate employ the silicon nitride films, of which the surfaces are implemented with ion beam bombardment, and in comparison with the utilization of PI alignment film material, the alignment layers possess the physical, chemical properties of silicon nitride, which are more stable, and thus can provide the better reliability for the liquid crystal panel; besides, the proper pre-tilted angle provided by the surface of the silicon nitride films with ion beam bombardment can be adjusted in a certain range, and thus can provide the proper pre-tilted angle for the liquid crystal molecules, and compared with the present PSVA technology, the procedure of utilizing the UV light irradiation to provide the pre-tilted angle for the liquid crystal is not required.

4 Claims, 2 Drawing Sheets

(52) U.S. Cl.
CPC .. *G02F 1/133514* (2013.01); *G02F 1/133734* (2013.01); *G02F 2001/133742* (2013.01)

(56) References Cited

U.S. PATENT DOCUMENTS

| | | | |
|---|---|---|---|
| 2008/0158492 A1* | 7/2008 | Rho | G02F 1/133734 349/123 |
| 2015/0055073 A1* | 2/2015 | Kim | G02F 1/133345 349/138 |
| 2016/0077383 A1* | 3/2016 | Lee | G02F 1/133723 349/43 |

* cited by examiner

LIQUID CRYSTAL PANEL STRUCTURE AND MANUFACTURE METHOD

FIELD OF THE INVENTION

The present invention relates to a display technology field, and more particularly to a liquid crystal panel structure and a manufacture method.

BACKGROUND OF THE INVENTION

The Thin Film Transistor Liquid Crystal Display (TFT-LCD) possesses advantages of thin body, power saving and no radiation to be widely used in many application scopes. Most of the LCDs on the present market are back light type liquid crystal display devices, which comprise a liquid crystal display panel and a back light module. Generally, the liquid crystal display panel comprises a Color Filter (CF) substrate, a Thin Film Transistor (TFT) substrate, a LC (Liquid Crystal) sandwiched between the CF substrate and the TFT substrate and sealant. The working principle of the liquid crystal display panel is to locate liquid crystal molecules between two parallel glass substrates. The light of back light module is reflected to generate images by applying driving voltages to control whether the liquid crystal molecules to be changed directions.

In the liquid crystal display panel, a layer of alignment film is also required to be formed on the thin film transistor substrate and a color film substrate in generally. After the alignment film contacts with the LC, it can make the LC have a pre-tilted angle in certain direction, and thus provide a loading angle (the pre-tilted angle has significant influence to the driving voltage, contrast, response time and view angle of the TFT-LCD) for the liquid crystal molecules. Polyimide (PI) is commonly chosen to be the material of the alignment film, which mainly has rubbing alignment type IP material and lighting alignment type IP material. However, either of the alignment materials has its own drawback. The rubbing alignment type IP material is to form the alignment film with Rubbing method. The Rubbing method is to use fabric roller to perform contacting directional mechanical friction on the macromolecular PI film surface. The energy provided by rubbing the macromolecular surface make the macromolecular main chain be aligned in direction due to the extension, and thus the interaction of the branch and the LC is controlled to align the LC in the direction of the pre-tilted angle; as rubbing, the issues of powder particles, residual electrostatic and brush marks reduce the process yield. The lighting alignment type IP material is to form the alignment film with photo-alignment technology. The photo-alignment technology is to utilize the photochemical reaction of the ultraviolet light polymer monomers to create the anisotropy, and the liquid crystal molecules and the alignment film surface branch interact with each other. For reaching the stable status of the minimum energy, the liquid crystal molecules are aligned along the direction of which the acted force is the maximum defined by the lighting alignment. The lighting alignment type IP material can solve the aforesaid problems but with the restriction of the material properties, the heat resistance and the aging resistance are poor, and meanwhile, the LC anchoring ability is weaker, the quality of the panel is influenced. Besides, the PI material itself has high polarity and high water absorption. The storage and the delivery can easily change the property to result in the nonuniform alignment. The price of the PI material is expensive, and the film formation process on the TFT-LCD is more complicated, which leads to the increase of the panel cost.

Besides, for the LCD in the mainstream market, three types, which respectively are Twisted Nematic (TN), In-Plane Switching (IPS) and Vertical Alignment (VA) can be illustrated. The VA liquid crystal display possesses extremely high contrast than the liquid crystal displays of other types. It has very wide application in large scale display, such as television or etc. The polymer-stabilized vertical alignment (PSVA) technology can make the liquid crystal display panel possess advantages of faster response time and high transmittance. The distinguishing feature is to form polymer protrusions on the surface of the alignment film with the reactive monomers in the liquid crystal material by ultraviolet light irradiation to make the liquid crystal molecules have a pre-tilted angle.

SUMMARY OF THE INVENTION

An objective of the present invention is to provide a liquid crystal panel structure, in which the silicon nitride film that the physical, chemical properties are stable, is employed to the alignment layer of implementing alignment to the liquid crystal, and the reliability is high and the manufacture process is simple.

Another objective of the present invention is to provide a manufacture method of a liquid crystal panel structure, in which the silicon nitride film that the physical, chemical properties are stable, is employed to the alignment layer of implementing alignment to the liquid crystal, and the reliability is high and the manufacture process is simple.

For realizing the aforesaid objectives, the present invention first provides a liquid crystal panel structure, comprising an upper substrate and a lower substrate which are oppositely located, and a liquid crystal layer arranged between the upper substrate and the lower substrate; wherein the upper substrate comprises a first substrate, and a first alignment layer located on one side of the first substrate, which is close to the liquid crystal layer;

the lower substrate comprises a second substrate, and a second alignment layer located on one side of the second substrate, which is close to the liquid crystal layer;

the first alignment layer and the second alignment layer are silicon nitride films after ion beam bombardment on surfaces of one sides close to the liquid crystal layer;

material of the liquid crystal layer comprises liquid crystal molecules, and the first alignment layer and the second alignment layer contact with the liquid crystal molecules in the liquid crystal layer to implement alignment thereto.

The upper substrate further comprises a black matrix, a color filter film, a first ITO electrode layer and spacers;

the black matrix is located on one side of the first substrate, which is close to the liquid crystal layer, and the color filter film is located on one side of the first substrate and the black matrix, which are close to the liquid crystal layer, and the first ITO electrode layer is located on one side of the color filter film, which is close to the liquid crystal layer, and the spacers are located on one side of the first ITO electrode layer, which is close to the liquid crystal layer, and the first alignment layer is located on one side of the first ITO electrode layer, which is close to the liquid crystal layer.

Selectably, the lower substrate further comprises a TFT array layer, a passivation protective layer and a second ITO electrode layer;

the TFT array layer is located on one side of the second substrate, which is close to the liquid crystal layer, and the passivation protective layer is located on one side of the TFT array layer, which is close to the liquid crystal layer, and the second ITO electrode layer is located on one side of the passivation protective layer, which is close to the liquid crystal layer, and the second alignment layer is located on one side of the second ITO electrode layer, which is close to the liquid crystal layer.

Selectably, the lower substrate further comprises a TFT array layer and a second ITO electrode layer which is patterned;

the TFT array layer is located on one side of the second substrate, which is close to the liquid crystal layer, and the second alignment layer is located on one side of the TFT array layer, which is close to the liquid crystal layer, and the second ITO electrode layer is located on one side of the second alignment layer, which is close to the liquid crystal layer;

the second ITO electrode layer comprises gaps, and the second alignment layer contacts with the liquid crystal molecules in the liquid crystal layer through the gaps of the second ITO electrode layer.

Thicknesses of the first alignment layer and the second alignment layer are 40-80 nm, and surface of the first alignment layer and the second alignment layer on one sides, which are close to the liquid crystal layer are implemented with ion beam bombardment of argon plasma, and the first alignment layer and the second alignment layer provide a pre-tilted angle of 80-90° to the liquid crystal molecules in the liquid crystal layer.

The present invention further provides a manufacture method of a liquid crystal panel, comprising steps of:

step 1, providing a first substrate, and depositing a layer of silicon nitride film on one side of the first substrate with PECVD, and implementing ion beam bombardment to a surface thereof to form a first alignment layer to obtain an upper substrate;

step 2, providing a second substrate, and depositing a layer of silicon nitride film on one side of the second substrate with PECVD, and implementing ion beam bombardment to a surface thereof to form a second alignment layer to obtain a lower substrate;

step 3, dispensing liquid crystal material containing liquid crystal molecules on one side of the upper substrate or the lower substrate, and making one side of the first substrate with the first alignment layer and one side of the second substrate with the second alignment layer be opposite with each other, and oppositely vacuum laminating the upper substrate and the lower substrate to form a liquid crystal layer between the upper substrate and the lower substrate to obtain the liquid crystal panel;

making the first alignment layer and the second alignment layer contact with the liquid crystal molecules in the liquid crystal layer to implement alignment thereto.

In the step 1 and the step 2, a specific procedure of forming the silicon nitride film with PECVD is supplying silane, ammonia and nitrogen, and forming the silicon nitride film with reaction at a temperature of 280-350° C., wherein a gas flow rate of the silane, the ammonia and the nitrogen is 100:1:200, and a thickness of the formed silicon nitride film is 40-80 nm;

in the step 1 and the step 2, a specific procedure of implementing ion beam bombardment to a surface of the silicon nitride film is supplying argon gas to form argon plasma, and implementing bombardment to the surface of the silicon nitride film with an ion beam constructed by the argon plasma under a working pressure of $10^{-4}$ Torr according to an angle of 30-50° with the surface of the silicon nitride film, wherein a concentration of the argon plasma in an ion beam bombardment reactor is $10^{14}$-$10^{15}$ ions/cm$^2$.

The step 1 further comprises: before forming the first alignment layer, forming a black matrix on the first substrate, and forming a color filter film on the first substrate and the black matrix, and forming a first ITO electrode layer on the color filter film, and forming spacers on the first ITO electrode layer;

in the step 1, the first alignment layer is formed on the first ITO electrode layer, and the obtained upper substrate comprises the first substrate, the black matrix, the color filter film, the first ITO electrode layer, the spacers and the first alignment layer.

Selectably, the step 2 further comprises: before forming the second alignment layer, forming a TFT array layer on the second substrate, and forming a passivation protective layer on the TFT array layer, and forming a second ITO electrode layer on the passivation protective layer;

in the step 2, the second alignment layer is formed on the second ITO electrode layer, and the obtained lower substrate comprises the second substrate, the TFT array layer, the passivation protective layer, the second ITO electrode layer and the second alignment layer.

Selectably, the step 2 further comprises: before forming the second alignment layer, forming a TFT array layer on the second substrate, and after forming the second alignment layer, forming a second ITO electrode layer, which is patterned on the second alignment layer;

in the step 2, the second alignment layer is formed on the TFT array layer to protect the TFT array layer, and the obtained lower substrate comprises the second substrate, the TFT array layer, the second alignment layer and the second ITO electrode layer;

the second ITO electrode layer comprises gaps, and in the liquid crystal panel obtained in the step 3, the second alignment layer contacts with the liquid crystal molecules in the liquid crystal layer through the gaps of the second ITO electrode layer.

The present invention further provides a liquid crystal panel structure, comprising an upper substrate and a lower substrate which are oppositely located, and a liquid crystal layer arranged between the upper substrate and the lower substrate; wherein the upper substrate comprises a first substrate, and a first alignment layer located on one side of the first substrate, which is close to the liquid crystal layer;

the lower substrate comprises a second substrate, and a second alignment layer located on one side of the second substrate, which is close to the liquid crystal layer;

the first alignment layer and the second alignment layer are silicon nitride films after ion beam bombardment on surfaces of one sides close to the liquid crystal layer;

material of the liquid crystal layer comprises liquid crystal molecules, and the first alignment layer and the second alignment layer contact with the liquid crystal molecules in the liquid crystal layer to implement alignment thereto;

wherein the upper substrate further comprises a black matrix, a color filter film, a first ITO electrode layer and spacers;

the black matrix is located on one side of the first substrate, which is close to the liquid crystal layer, and the color filter film is located on one side of the first substrate and the black matrix, which are close to the liquid crystal layer, and the first ITO electrode layer is located on one side of the color filter film, which is close to the liquid crystal layer, and the spacers are located on one side of the first ITO electrode layer, which is close to the liquid crystal layer, and the first alignment layer is located on one side of the first ITO electrode layer, which is close to the liquid crystal layer;

wherein thicknesses of the first alignment layer and the second alignment layer are 40-80 nm, and surface of the first alignment layer and the second alignment layer on one sides, which are close to the liquid crystal layer are implemented with ion beam bombardment of argon plasma, and the first alignment layer and the second alignment layer provide a pre-tilted angle of 80-90° to the liquid crystal molecules in the liquid crystal layer.

The benefits of the present invention are: in the liquid crystal panel structure and the manufacture method according to the present invention, the silicon nitride film is employed to be the alignment layer of implementing alignment to the liquid crystal, and in comparison with prior art, the present invention possesses advantages below:

(1), compared with PI material, the physical, chemical properties of silicon nitride are more stable, which can provide the better reliability for the liquid crystal panel;

(2), the surface of the silicon nitride film can provide the proper pre-tilted angle for the liquid crystal after ion beam bombardment, and compared with the present PSVA technology, the procedure of utilizing the UV light irradiation to provide the pre-tilted angle for the liquid crystal is not required;

(3), compared with the PSVA technology, the following UV light irradiation reaction is not required, and then, it is not required to add the reactive monomers in the liquid crystal material, to promote the reliability of the liquid crystal panel in advance;

(4), the apparatus and the process of growing silicon nitride is pretty mature in the TFT-LCD manufacture industry, and besides, the silicon nitride film also can be employed to be the passivation protective layer, and thus the manufacture cost and material cost are significantly reduced.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
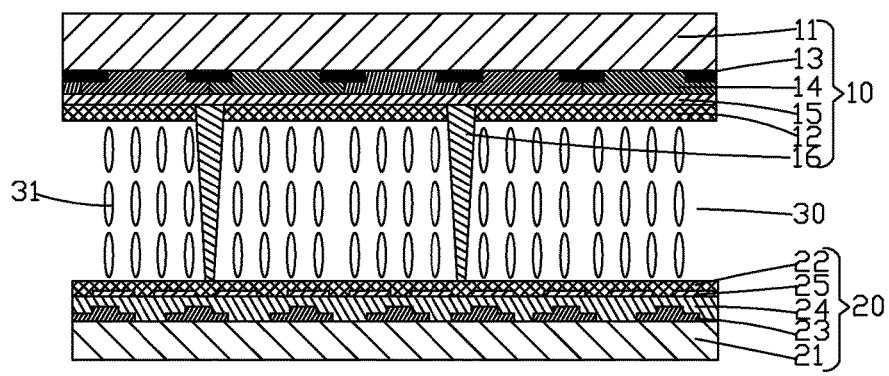
FIG. 1 is a structure diagram of the first embodiment according to the liquid crystal panel structure of the present invention.

Please refer to FIG. 1, which is a structure diagram of the first embodiment according to the liquid crystal panel structure of the present invention. The liquid crystal panel structure of this embodiment comprises an upper substrate 10 and a lower substrate 20 which are oppositely located, and a liquid crystal layer 30 arranged between the upper substrate 10 and the lower substrate 20.

Specifically, the upper substrate 10 is a color film substrate, comprising a first substrate 11, a black matrix 13 located on the first substrate 11, a color filter layer 14 located on the first substrate 11 and the black matrix 13, a first ITO electrode layer 15 located on color filter layer 14, spacers 16 located on the first ITO electrode layer 15 and a first alignment layer 12 located on the first ITO electrode layer 15, and the first alignment layer 12 also covers on the spacers 16.

Specifically, the lower substrate 20 is a TFT array substrate, comprising a second substrate 21, a TFT array layer 23 located on the second substrate 21, a passivation protective layer 24 located on the TFT array layer 23 and a second alignment layer 22 located on the passivation protective layer 24.

Specifically, the first, the second alignment layers 12, 22 are silicon nitride films (SiNx) after ion beam bombardment on surfaces of one sides close to the liquid crystal layer 30.

Specifically, material of the liquid crystal layer 30 comprises liquid crystal molecules 31, and the first, the second alignment layers 12, 22 contact with the liquid crystal molecules 31 in the liquid crystal layer 30 to implement alignment thereto.

Specifically, thicknesses of the first, the second alignment layers 12, 22 are 40-80 nm, and surface of the first, the second alignment layers 12, 22 on one sides, which are close to the liquid crystal layer 30 are implemented with ion beam bombardment of argon plasma with a certain angle therewith. Preferably, the angle of the ion beam of the argon plasma appears an angle of 30-50° with the surface on one sides, which are close to the liquid crystal layer 30, and the first, the second alignment layers 12, 22 provide a pre-tilted angle of 80-90° to the liquid crystal molecules 31 in the liquid crystal layer 30.

Figure 2:
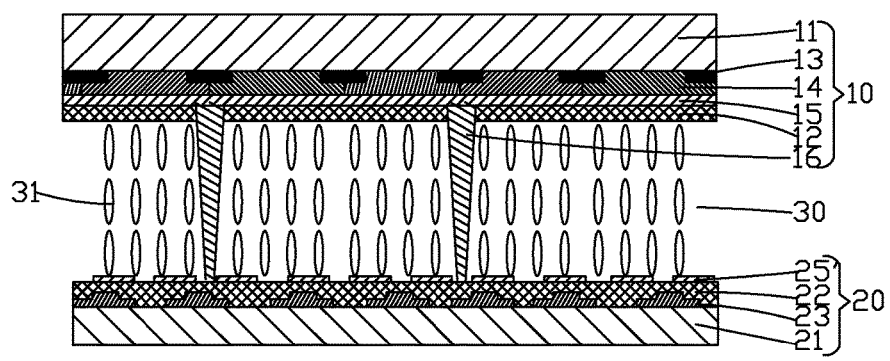
FIG. 2 is a structure diagram of the second embodiment according to the liquid crystal panel structure of the present invention.

Please refer to FIG. 2, which is a structure diagram of the second embodiment according to the liquid crystal panel structure of the present invention. Compared with the aforesaid first embodiment, in this embodiment, the lower substrate 20 comprises a second substrate 21, a TFT array layer 23, a second ITO electrode layer 25' and a second alignment layer 22. Particularly, the second ITO electrode layer 25' is a patterned film layer, which is the pattern having gaps. The lower substrate 20 does not comprises a passivation protective layer 24, and the second alignment layer 22 replaces the passivation protective layer 24 in the first embodiment, and is positioned between the TFT array layer 23 and the second ITO electrode layer 25', and the second alignment layer 22 contacts with the liquid crystal molecules 31 in the liquid crystal layer 30 through the gaps on the second ITO electrode layer 25'. Thus, the second alignment layer 22 in this embodiment can act to be the passivation protective layer to protect the TFT array layer 23 and also can act to be the alignment layer of implementing alignment to the liquid crystal molecules 31.

In the liquid crystal panel structure of the present invention, both the first alignment layer 12 of the upper layer 10 and the second alignment layer 22 of the lower substrate 20 employ the silicon nitride films, of which the surfaces are on one sides close to the liquid crystal layer 30, are implemented with ion beam bombardment, and in comparison with the utilization of PI alignment film material, the alignment layers possess the physical, chemical properties of silicon nitride, which are more stable, and thus can provide the better reliability for the liquid crystal panel; besides, the pre-tilted angle provided for the liquid crystal molecules 31 can be adjusted in a range of 80-90°, and thus can provide the proper pre-tilted angle for the liquid crystal molecules 31, and compared with the present PSVA technology, the procedure of utilizing the UV light irradiation to provide the pre-tilted angle for the liquid crystal is not required; compared with the PSVA technology, the following UV light irradiation reaction is not required, and then, it is not required to add the reactive monomers in the liquid crystal layer 30, to promote the reliability of the liquid crystal panel in advance; moreover, the apparatus and the process of growing silicon nitride is pretty mature in the TFT-LCD manufacture industry, and thus the manufacture cost and material cost are significantly reduced.

Figure 3:
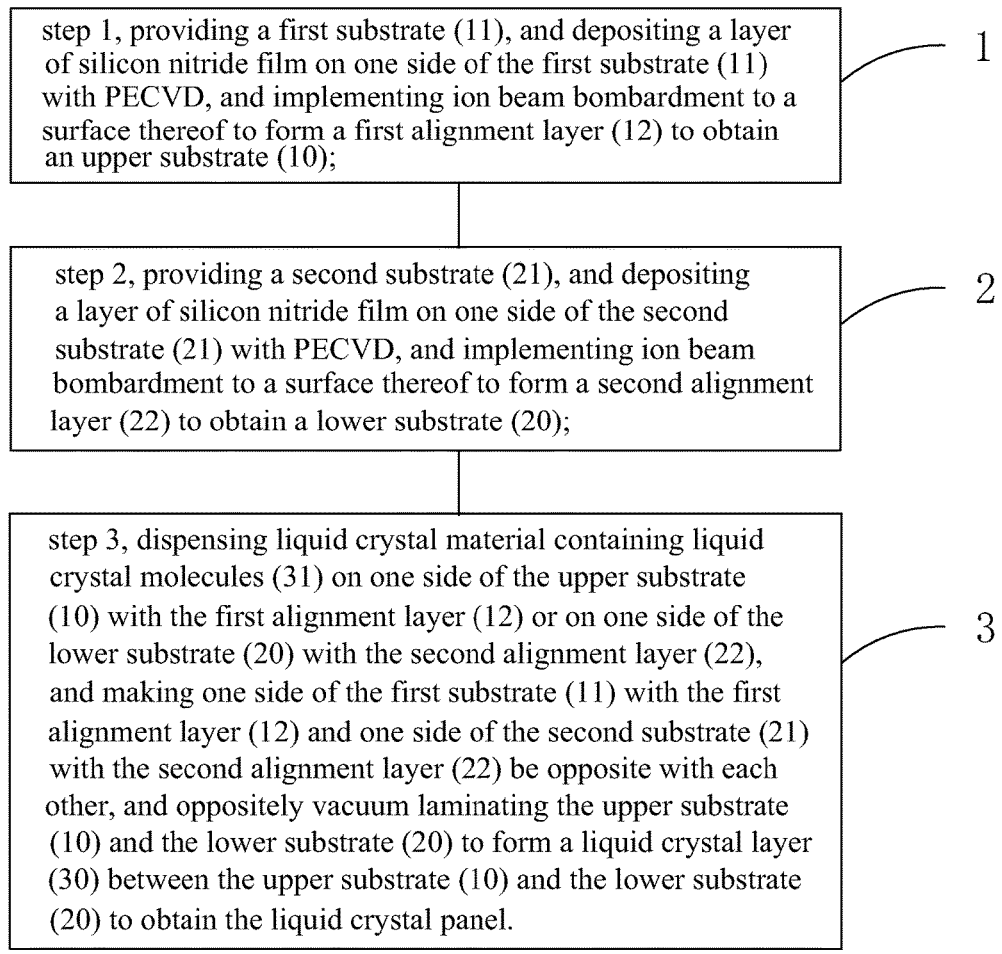
FIG. 3 is a flowchart of the manufacture method of the liquid crystal panel structure according to the present invention.

Please refer to FIG. 3. The present invention further provides a manufacture method of a liquid crystal panel, comprising steps of:

step 1, providing a first substrate 11, and forming a black matrix 13 on the first substrate 11, and forming a color filter film 14 on the first substrate 11 and the black matrix 13, and forming a first ITO electrode layer 15 on the color filter film 14, and forming spacers 16 on the first ITO electrode layer 15, and depositing a layer of silicon nitride film on the first ITO electrode layer 15 with PECVD, and implementing ion beam bombardment to a surface thereof to form a first alignment layer 12 to obtain an upper substrate 10, comprising the first substrate 11, the black matrix 13, the color filter film 14, the first ITO electrode layer 15, the spacers 16 and the first alignment layer 12.

step 2, providing a second substrate 21, and forming a TFT array substrate 23 on the second substrate 21, and forming a passivation protective layer 24 on the TFT array substrate 23, and forming a second ITO electrode layer 25 on the passivation protective layer 24, and depositing a layer of silicon nitride film on the second ITO electrode layer 25 with PECVD, and implementing ion beam bombardment to a surface thereof to form a second alignment layer 22 to obtain a lower substrate 20, comprising the second substrate 21, the TFT array substrate 23, the passivation protective layer 24, the second ITO electrode layer 25 and the second alignment layer 22.

Specifically, in the step 1 and the step 2, a specific procedure of forming the silicon nitride film with PECVD is supplying silane ($SiH_4$), ammonia ($NH_3$) and nitrogen ($N_2$), and forming the silicon nitride film with reaction at a temperature of 280-350° C., wherein a gas flow rate of the silane, the ammonia and the nitrogen is 100:1:200, and a thickness of the formed silicon nitride film is 40-80 nm.

Specifically, in the step 1 and the step 2, a specific procedure of implementing ion beam bombardment to a surface of the silicon nitride film is supplying argon gas to form argon plasma, and implementing bombardment to the surface of the silicon nitride film with an ion beam constructed by the argon plasma under a working pressure of $10^{-4}$ Torr according to an angle of 30-50° with the surface of the silicon nitride film, wherein a concentration of the argon plasma in an ion beam bombardment reactor is $10^{14}$-$10^{15}$ ions/$cm^2$.

step 3, dispensing liquid crystal material containing liquid crystal molecules 31 on one side of the upper substrate 10 or the lower substrate 20, and making one side of the first substrate 11 with the first alignment layer 12 and one side of the second substrate 21 with the second alignment layer 22 be opposite with each other, and oppositely vacuum laminating the upper substrate 10 and the lower substrate 20 to form a liquid crystal layer 30 between the upper substrate 10 and the lower substrate 20 to obtain the liquid crystal panel shown in FIG. 1.

Specifically, the first, the second alignment layers 12, 22 contact with the liquid crystal molecules 31 in the liquid crystal layer 30 to implement alignment thereto.

In another embodiment according to the liquid crystal panel structure of the present invention, compared with the aforesaid first embodiment, the difference is that in the step 2, after forming the TFT array layer 23, the passivation protective layer 24 is not formed but a layer of silicon nitride film deposited on the TFT array layer 23 with PECVD, and ion beam bombardment is implemented to a surface thereof to form a second alignment layer 22, and then, a second ITO electrode layer 25', which is patterned is formed on the second alignment layer 22. Thus, the lower substrate obtained in the step 2 dose not comprises the passivation protective layer 24, and the liquid crystal panel shown in FIG. 2 is obtained in the step 3, wherein the second alignment layer 22 contacts with the liquid crystal molecules 31 in the liquid crystal layer 30 through the gaps on the second ITO electrode layer 25'. Thus, the second alignment layer 22 in this embodiment can act to be the passivation protective layer to protect the TFT array layer 23 and also can act to be the alignment layer of implementing alignment to the liquid crystal molecules 31.

In the manufacture method of the liquid crystal panel according to the present invention, both the first alignment layer 12 of the upper layer 10 and the second alignment layer 22 of the lower substrate 20 employ the silicon nitride films implemented with ion beam bombardment, and in comparison with the utilization of PI alignment film material, the alignment layers possess the physical, chemical properties of silicon nitride, which are more stable, and thus can provide the better reliability for the liquid crystal panel; besides, the pre-tilted angle provided for the liquid crystal molecules 31 can be adjusted in a range of 80-90°, and thus can provide the proper pre-tilted angle for the liquid crystal molecules 31, and compared with the present PSVA technology, the procedure of utilizing the UV light irradiation to provide the pre-tilted angle for the liquid crystal is not required; compared with the PSVA technology, the following UV light irradiation reaction is not required, and then, it is not required to add the reactive monomers in the liquid crystal layer 30, to promote the reliability of the liquid crystal panel in advance; moreover, the apparatus and the process of growing silicon nitride is pretty mature in the TFT-LCD manufacture industry, and thus the manufacture cost and material cost are significantly reduced.

In conclusion, in the liquid crystal panel structure and the manufacture method according to the present invention, both the first alignment layer of the upper layer and the second alignment layer of the lower substrate employ the silicon nitride films, of which the surfaces are implemented with ion beam bombardment, and in comparison with the utilization of PI alignment film material, the alignment layers possess the physical, chemical properties of silicon nitride, which are more stable, and thus can provide the better reliability for the liquid crystal panel; besides, the proper pre-tilted angle provided by the surface of the silicon nitride films with ion beam bombardment can be adjusted in a certain range, and thus can provide the proper pre-tilted angle for the liquid crystal molecules, and compared with the present PSVA technology, the procedure of utilizing the UV light irradiation to provide the pre-tilted angle for the liquid crystal is not required; compared with the PSVA technology, the following UV light irradiation reaction is not required, and then, it is not required to add the reactive monomers in the liquid crystal layer, to promote the reliability of the liquid crystal panel in advance; moreover, the apparatus and the process of growing silicon nitride is pretty mature in the TFT-LCD manufacture industry, and thus the manufacture cost and material cost are significantly reduced.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A liquid crystal panel structure, comprising an upper substrate and a lower substrate which are oppositely located, and a liquid crystal layer arranged between the upper substrate and the lower substrate; wherein
   the upper substrate comprises a first substrate, and a first alignment layer located on one side of the first substrate, which is close to the liquid crystal layer;
   the lower substrate comprises a second substrate, and a second alignment layer located on one side of the second substrate, which is close to the liquid crystal layer;
   the first alignment layer and the second alignment layer are silicon nitride films after ion beam bombardment on surfaces of one sides close to the liquid crystal layer;
   material of the liquid crystal layer comprises liquid crystal molecules, and the first alignment layer and the second alignment layer contact with the liquid crystal molecules in the liquid crystal layer to implement alignment thereto,
   wherein the lower substrate further comprises a TFT array layer and a second ITO electrode layer which is patterned;
   the TFT array layer is located on one side of the second substrate, which is close to the liquid crystal layer, and the second alignment layer is located on one side of the TFT array layer, which is close to the liquid crystal layer, to act as a passivation protective layer to protect the TFT array layer and meanwhile to implement alignment to the liquid crystal molecules with the first alignment layer for providing a pre-tilted angle to liquid crystal molecules without adding reactive monomers in the liquid crystal layer and without utilizing UV light irradiation to the reactive monomers in the liquid crystal layer to provide the pre-tilted angle to the liquid crystal molecules, and the second ITO electrode layer is located on one side of the second alignment layer, which is close to the liquid crystal layer;
   the second ITO electrode layer comprises gaps, and the second alignment layer contacts with the liquid crystal molecules in the liquid crystal layer through the gaps of the second ITO electrode layer.

2. The liquid crystal panel structure according to claim 1, wherein the upper substrate further comprises a black matrix, a color filter film, a first ITO electrode layer and spacers;
   the black matrix is located on one side of the first substrate, which is close to the liquid crystal layer, and the color filter film is located on one side of the first substrate and the black matrix, which are close to the liquid crystal layer, and the first ITO electrode layer is located on one side of the color filter film, which is close to the liquid crystal layer, and the spacers are located on one side of the first ITO electrode layer, which is close to the liquid crystal layer, and the first alignment layer is located on one side of the first ITO electrode layer, which is close to the liquid crystal layer.

3. The liquid crystal panel structure according to claim 1, wherein thicknesses of the first alignment layer and the second alignment layer are 40-80 nm, and surface of the first alignment layer and the second alignment layer on one sides, which are close to the liquid crystal layer are implemented with ion beam bombardment of argon plasma, and the first alignment layer and the second alignment layer provide the pre-tilted angle of 80-90° to the liquid crystal molecules in the liquid crystal layer.

4. A liquid crystal panel structure, comprising an upper substrate and a lower substrate which are oppositely located, and a liquid crystal layer arranged between the upper substrate and the lower substrate; wherein
   the upper substrate comprises a first substrate, and a first alignment layer located on one side of the first substrate, which is close to the liquid crystal layer;
   the lower substrate comprises a second substrate, and a second alignment layer located on one side of the second substrate, which is close to the liquid crystal layer;
   the first alignment layer and the second alignment layer are silicon nitride films after ion beam bombardment on surfaces of one sides close to the liquid crystal layer;
   material of the liquid crystal layer comprises liquid crystal molecules, and the first alignment layer and the second alignment layer contact with the liquid crystal molecules in the liquid crystal layer to implement alignment thereto;
   wherein the lower substrate further comprises a TFT array layer and a second ITO electrode layer which is patterned;
   the TFT array layer is located on one side of the second substrate, which is close to the liquid crystal layer, and the second alignment layer is located on one side of the TFT array layer, which is close to the liquid crystal layer, to act as a passivation protective layer to protect the TFT array layer and meanwhile to implement alignment to the liquid crystal molecules with the first alignment layer for providing a pre-tilted angle to liquid crystal molecules without adding reactive monomers in the liquid crystal layer and without utilizing UV light irradiation to the reactive monomers in the liquid crystal layer to provide the pre-tilted angle to the liquid crystal molecules, and the second ITO electrode layer is located on one side of the second alignment layer, which is close to the liquid crystal layer;
   the second ITO electrode layer comprises gaps, and the second alignment layer contacts with the liquid crystal molecules in the liquid crystal layer through the gaps of the second ITO electrode layer;
   wherein the upper substrate further comprises a black matrix, a color filter film, a first ITO electrode layer and spacers;
   the black matrix is located on one side of the first substrate, which is close to the liquid crystal layer, and the color filter film is located on one side of the first substrate and the black matrix, which are close to the liquid crystal layer, and the first ITO electrode layer is located on one side of the color filter film, which is close to the liquid crystal layer, and the spacers are located on one side of the first ITO electrode layer, which is close to the liquid crystal layer, and the first alignment layer is located on one side of the first ITO electrode layer, which is close to the liquid crystal layer;
   wherein thicknesses of the first alignment layer and the second alignment layer are 40-80 nm, and surface of the first alignment layer and the second alignment layer on one sides, which are close to the liquid crystal layer are implemented with ion beam bombardment of argon plasma, and the first alignment layer and the second alignment layer provide the pre-tilted angle of 80-90° to the liquid crystal molecules in the liquid crystal layer.

\* \* \* \* \*